Figure 1:
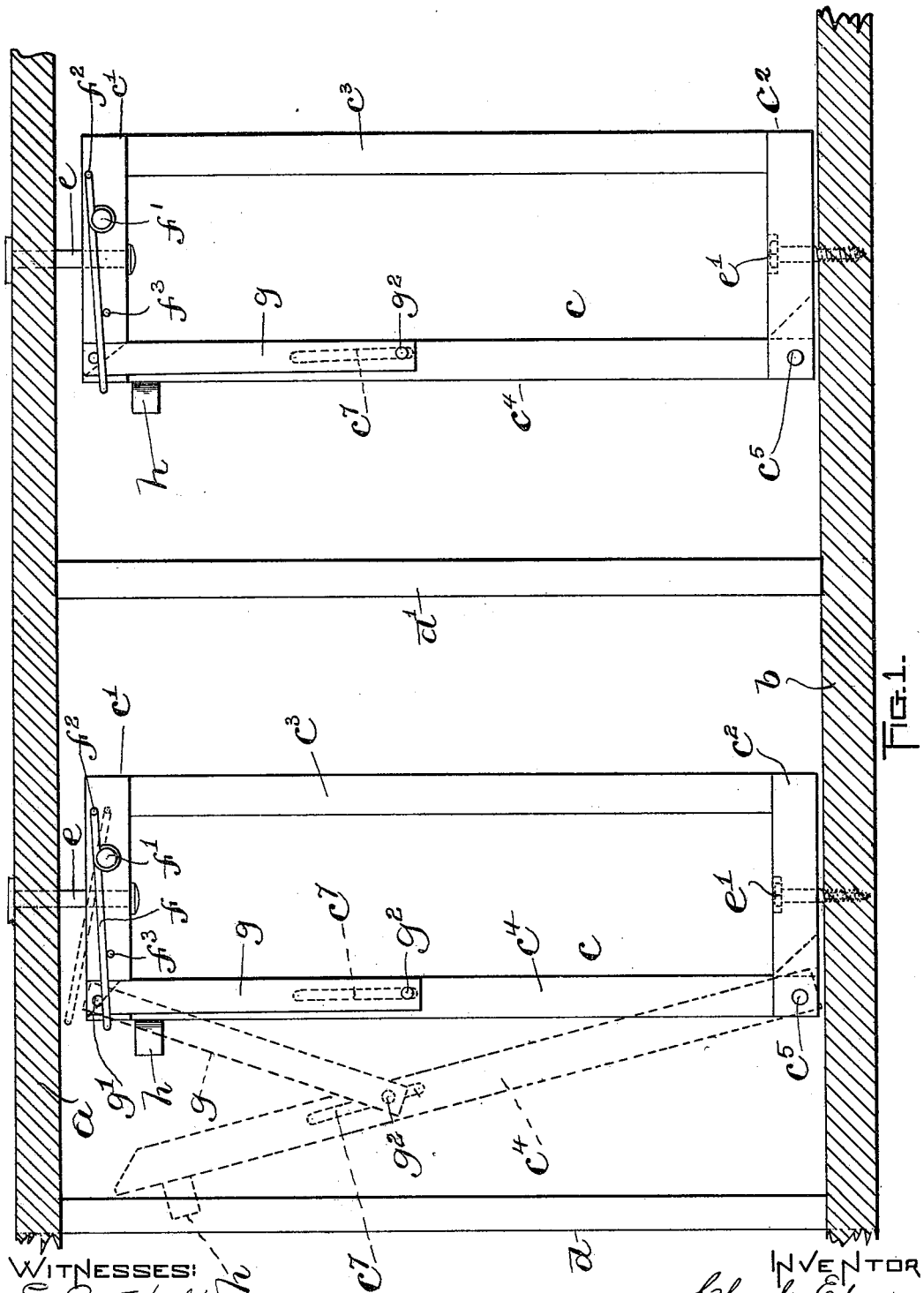

No. 644,414. Patented Feb. 27, 1900.
C. EDWARDS.
STANCHION.
(Application filed July 28, 1899.)
(No Model.) 2 Sheets—Sheet 1.

Witnesses: E. Batchelder, P. W. Pizzetti.

Inventor: Clark Edwards
By Wright Brown & Quinby
Attys

No. 644,414. Patented Feb. 27, 1900.
C. EDWARDS.
STANCHION.
(Application filed July 28, 1899.)
(No Model.) 2 Sheets—Sheet 2.
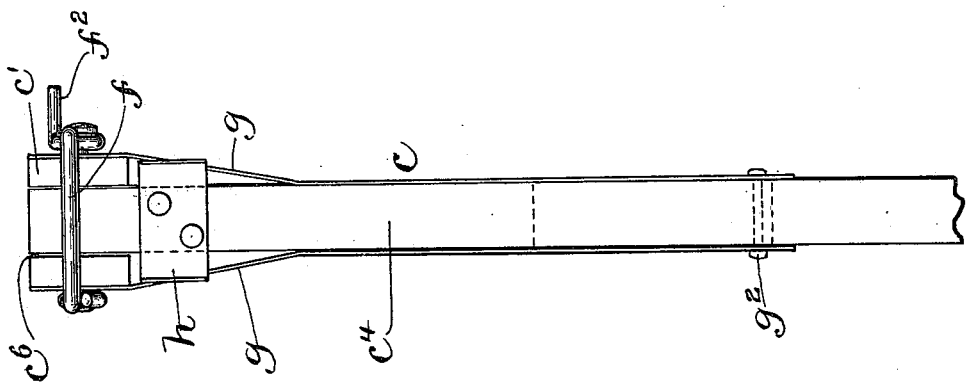
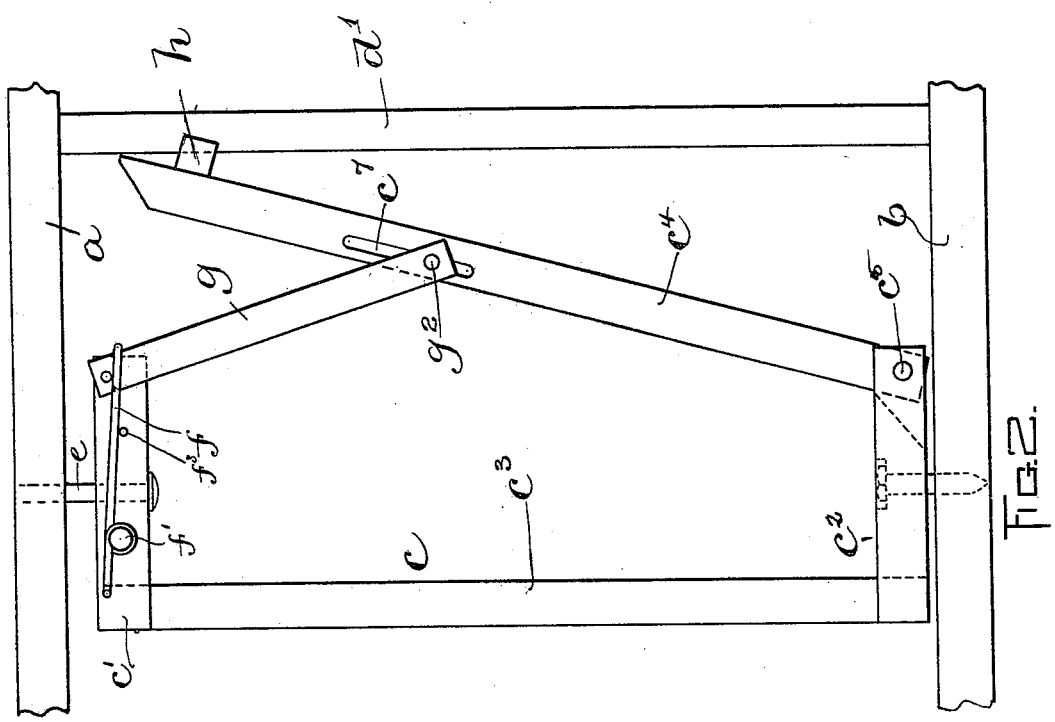

UNITED STATES PATENT OFFICE.

CLARK EDWARDS, OF LISBON, NEW HAMPSHIRE.

STANCHION.

SPECIFICATION forming part of Letters Patent No. 644,414, dated February 27, 1900.

Application filed July 28, 1899. Serial No. 725,375. (No model.)

*To all whom it may concern:*

Be it known that I, CLARK EDWARDS, of Lisbon, in the county of Grafton and State of New Hampshire, have invented certain new and useful Improvements in Stanchions, of which the following is a specification.

This invention relates to stanchions; and it consists in certain novel features of construction and arrangement, which are hereinafter fully set forth and claimed.

Of the accompanying drawings, Figure 1 represents a front elevation of a stanchion constructed in accordance with my invention. Fig. 2 represents a similar view of the same in a reverse position and opened out. Fig. 3 represents an end view of the stanchion.

The same reference characters indicate the same parts in all the figures.

In the drawings, $a$ and $b$ designate the upper and lower supports, between which the stanchion $c$ is swiveled, and $d$ $d'$ designate fixed beams, such as the upright beams usually placed between adjacent stalls.

The stanchion comprises a frame consisting of the rigid portion, composed of the upper and lower cross-bars $c'$ $c^2$ and the connecting vertical bar $c^3$, and the swinging portion or bar $c^4$, pivoted at its lower end at $e^5$ to the lower cross-bar $c^2$ and constituting the fourth side of the rectangular frame. The frame is pivoted to its supports by swivel-bolts $e$ $e'$.

When the stanchion is closed, the swinging bar $c^4$ is in an upright position, as shown in full lines in Fig. 1, and is then held by a catch $f$, pivoted at $f'$ to the upper cross-bar $c'$ and constructed as a loop, which normally passes around the end of the cross-bar $c'$ and confines the upper end of the swinging bar $c^4$ in a recess $c^6$, Fig. 3, provided in the end of said cross-bar. The catch rests in its normal position on a pin $f^3$, projecting from the side of the cross-bar. When it is desired to open the stanchion and release the animal, the outer end of the catch is lifted and the swing-bar allowed to fall away, as represented in broken lines in Fig. 1. For convenience in manipulating the catch $f$ one of its ends may, as shown, be extended to the rear of the pivot $f'$ and turned outwardly to form a short handle $f^2$. The upper end of the swing-bar $c^4$ is beveled on the inside, so that when replaced it will automatically lift the catch $f$ and become engaged therewith.

$g$ $g$ represent guiding and retaining arms for the swing-bar $c^4$, said arms being pivoted at $g'$ at their upper ends to the end of the cross-bar $c'$ and having a sliding connection with the swing-bar consisting of a pin $g^2$, joining the lower ends of the guiding-arms and passing through an elongated slot $c^7$, formed in the swinging bar. To the upper end of the swing-bar is secured a U-shaped or forked member $h$, which I term a "clamp" and which is adapted to engage one of the side uprights $d$ $d'$ when the stanchion is open to prevent said stanchion from turning on its pivot. The clamp $h$ may conveniently be formed of a strip of sheet metal bent to shape and bolted to the swing-bar $c^4$. When it is engaged with the upright, its arms embrace the sides of the upright.

It has been customary heretofore in constructing stanchions to affix a fork or clamp to one of the side uprights between the stalls or in an analogous position, where the upper end of the swing-bar could engage it when swung out; but by transferring the clamp from the fixed upright to the swing-bar I provide an arrangement in which the clamp forms less of an obstruction than heretofore, and, furthermore, I furnish a readily-reversible stanchion which can be employed to open toward either the right-hand or the left-hand side of the stall without necessitating the use of a second clamp. When the stanchion opens to the left, as represented in broken lines in Fig. 1, its swing-bar becomes engaged through the clamp $h$ with the upright $d$ at the left of the stall, and when reversed so as to open to the right, as represented in Fig. 2, the swing-bar engages the upright $d'$ at the right of the stall. Some persons will be enabled to operate the stanchion most conveniently opening to the right and others opening to the left. When the stanchion is reversed from the position of use shown in Fig. 1 to that of Fig. 2, the catch $f$ may also be reversed by taking out its pivot-bolt $f'$ and turning it over, so as to bring the handle $f^2$ to the front, or said catch may be provided with a handle extension on both sides of the stanchion, so as not to require reversal, or the handle extension may be omitted altogether without affecting the operativeness of the structure.

The side arms $g$ act to steady and guide the swing-bar $c^4$ and their novel manner of attachment to the swing-bar by means of the slot $c^7$ in the latter and the pin $g^2$, attached to said arms and traveling in the said slot, affords a positive and simple connection, so constructed as to prevent the swing-bar from becoming separated from the guiding-arms. Owing to the fact that the arms $g$ are permanently connected with the swing-bar $c^4$, although permitting the latter to swing owing to the slot-and-pin connection heretofore described, there is no possibility of said arms $g$ disengaging from the swing-bar $c^4$ when the stanchion is swung around, so that the clamp $h$ may engage either the beam $d$ or the beam $d'$.

I claim—

In a device of the character described, the stanchion-frame comprising upper and lower cross-bars the upper one having a recess in its end, a vertical bar connecting the ends of the cross-bars at one side of the frame, a swing-bar pivotally connected to the other end of the lower cross-bar and having its upper end beveled on the inner side and adapted to fit the recess in the end of the upper cross-bar, said swing-bar being provided with an elongated slot $c^7$, arms pivoted at their upper ends to the upper part of the stanchion-frame and having a pin at their lower ends occupying the said slot in the swing-bar, the forked clamp $h$ secured to the upper end of the swing-bar and adapted to engage either of two fixed uprights according as the stanchion is employed as a right-hand-opening or a left-hand-opening stanchion, and a loop-shaped catch pivoted to the upper cross-bar and adapted to normally pass around and confine the upper end of the swing-bar in the recess of the upper cross-bar, said catch being adapted to be automatically lifted by the incline of the swing-bar when said swing-bar is being moved from its outward to its inner position, and to then drop over and confine the upper end of said swing-bar in the recess of the upper cross-bar.

In testimony whereof I have affixed my signature in presence of two witnesses.

CLARK EDWARDS.

Witnesses:
CHARLES R. STREETER,
HERBERT SMITH.